United States Patent [19]

Hertel

[11] 4,394,409

[45] Jul. 19, 1983

[54] COMPOSITE WOOD ARTICLE AND METHOD OF MANUFACTURE

[75] Inventor: James E. Hertel, Seattle, Wash.

[73] Assignee: Weyerhaeuser Company, Tacoma, Wash.

[21] Appl. No.: 246,924

[22] Filed: Mar. 23, 1981

Related U.S. Application Data

[63] Continuation of Ser. No. 835,944, Sep. 22, 1977, abandoned.

[51] Int. Cl.³ .......................... E04C 3/30; F16L 9/00; B32B 31/00; B27B 1/00

[52] U.S. Cl. ........................................ 428/36; 52/731; 52/DIG. 8; 138/157; 138/177; 144/346; 144/347; 156/264; 156/292

[58] Field of Search ..................... 428/54, 57, 188, 36; 144/312, 313, 314 R, 316, 317, 309 L, 346, 347, 354, 355; 156/264, 292; 52/731, DIG. 8, 720; 138/157, 177

[56] References Cited

U.S. PATENT DOCUMENTS

| | | | |
|---|---|---|---|
| 839,189 | 12/1906 | Oberbeck | 52/727 |
| 2,578,781 | 12/1951 | Brundige | 156/292 |
| 3,788,372 | 1/1974 | Terenzoni | 144/316 |
| 3,961,654 | 6/1976 | Hasenwink | 144/316 |
| 4,050,489 | 9/1977 | Werner | 144/315 R |
| 4,256,287 | 3/1981 | Birmingham | 52/731 |

FOREIGN PATENT DOCUMENTS

| | | | |
|---|---|---|---|
| 65497 | 11/1942 | Norway | 52/720 |

*Primary Examiner*—William R. Dixon, Jr.
*Attorney, Agent, or Firm*—Weyerhaeuser Company

[57] ABSTRACT

A composite wood article includes a plurality of four elongated triangular-shaped pieces and opposing pieces are substantially similar in cross-sectional dimensions. They are joined together to form a composite parallelogram in cross-section. One alternative embodiment includes using sector-shaped pieces that have been cut from generally cylindrical logs, while another embodiment includes triangular-shaped pieces cut from readily available rectangular lumber. In the process of manufacturing the composite article, the four triangular-shaped pieces are first machined so they are properly sized and then after the appropriate application of adhesive to the surfaces which will form the connecting joints, the joinder base leg of each triangular-shaped piece is positioned so as to be juxtaposed against the adjacent joinder leg of the next adjacent triangular-shaped piece. Once all four triangular-shaped pieces are positioned properly, the loosely connected composite is then directed into a pressing station where suitable pressure is exerted on the plurality of joints to cure the adhesive. After the joints are cured, the composite article may then be machined to its final dimension.

4 Claims, 6 Drawing Figures

COMPOSITE WOOD ARTICLE AND METHOD OF MANUFACTURE

This is a continuation of application Ser. No. 835,944, filed on Sept. 22, 1977, abandoned.

BACKGROUND OF THE INVENTION

This invention relates generally to a composite wood article and its method of manufacture. More particularly, it relates to a composite wood article comprised of a plurality of triangular-shaped pieces that, when joined together and in final form, provide a rigid structural composite member suitable for many end uses.

In several prior art patents, for example the U.S. Pat. No. 3,961,654 to Hasenwinkle assigned to the assignee of the present invention, there are disclosed various processes whereby triangular-shaped pieces and/or sector-shaped pieces are utilized in the formation of composite wood articles. In view of the pertinent disclosure in the Hasenwinkle patent of several detailed cutting steps which are utilized for the practice of the process disclosed herein, the Hasenwinkle U.S. Pat. No. 3,961,654 is incorporated herein by reference to provide a complete disclosure of the present invention.

As the supply of large old-growth timber continues to be depleted, larger and larger amounts of smaller-sized, second, third, and subsequent growth timber will be converted into usable wood products. Since in the past it had been common practice with the large old-growth logs to have the freedom and flexibility to manufacture large-dimension wood products of various types, it is now necessary to conceive new products and methods of manufacture to convert the smaller-diameter logs into wood products that have the necessary dimensional and structural characteristics. The composite lumber article as disclosed in the aforementioned Hasenwinkle patent is one example of a composite lumber article that may be manufactured from small-diameter logs and then by utilizing a subsequent rejoining process, flexible final dimensions may be obtained.

The present invention provides for a great deal of flexibility in final product configuration. For example, the process can provide a central elongated aperture within the composite article and the aperture can then be used for many purposes such as for enclosing wires or other elements. If a sector-cutting process is employed to produce sector-shaped pieces that will then be utilized to manufacture the present composite article, the sectors can be sized accordingly to yield final composite article dimensions. There is also a degree of flexibility in providing strength characteristics for the final article in that the triangular-shaped pieces can be thicker if additional strength is desired.

Another desirable feature of the present invention is that the manufacturing process has the capability of utilizing less wood to develop the same cross-sectional shape as compared to prior art solid wood articles. When utilizing sector-shaped pieces cut from a log as opposed to large rectangular solid-sawn pieces, there is an inherent savings in wood volume. This savings in wood volume may be fully understood by referring to the aforementioned Hasenwinkle patent incorporated herein by reference.

SUMMARY OF THE INVENTION

Briefly stated, this invention is practiced in one form by including in a composite wood article a plurality of four triangular-shaped pieces that have the two pair of the two opposed pieces with substantially similar sizes. The pieces are bonded together into the cross-sectional shape of a parallelogram with the largest angle in each piece of at least one opposed pair of pieces positioned internally of the exterior faces. An appropriate joining means is through the use of adhesive and the application of pressure to cure the connecting joints. Before the pieces are joined together, they are appropriately machined and similarly after the joints are cured, a final machining step may be carried out to finally dimension the composite wood article.

DESCRIPTION OF THE PREFERRED EMBODIMENTS AND BEST MODE OF CARRYING OUT THE INVENTION

Figure 1:
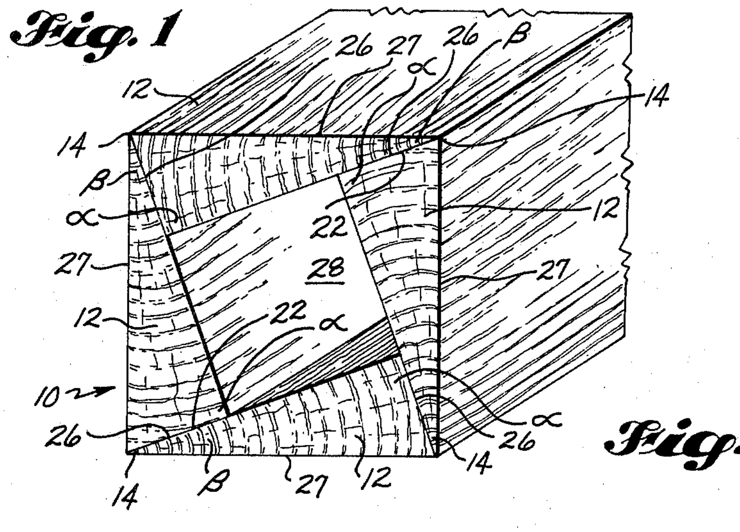
FIG. 1 is an end view in isometric form depicting the composite wood article.
Figure 2:
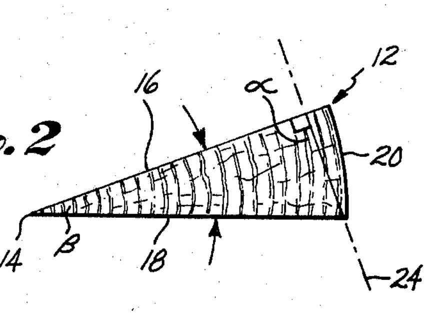
FIG. 2 is an end view of a single triangular-shaped piece suitable for use in the composite wood article.

Referring first to FIGS. 1 and 2 and the disclosure of Hasenwinkle U.S. Pat. No. 3,961,654, the basic description of the composite article and its method of manufacture will be given. The first step in the process of manufacturing the composite wood article is the generation of suitably sized, triangular-shaped pieces. The composite wood article indicated generally at 10 in FIG. 1 is comprised of a plurality of triangular-shaped pieces 12 joined together in a manner to be described. In FIGS. 1 and 2 the triangular-shaped pieces are substantially similar in cross-sectional dimensions and are depicted as sector-shaped pieces cut from generally cylindrically shaped logs. By referring to the Hasenwinkle patent, the log cutting method will be completely understood by those skilled in the art. While each of the triangular-shaped pieces 12 is shown as being substantially similar in size, it is not an absolute requirement in forming the composite wood article. A requirement of the present invention is, however, that each of two opposite disposed triangular-shaped pieces 12 be substantially equal in size in order to form a parallelogram in cross-section. In FIG. 2 the smallest angle at apex 14 is designated as $\beta$ and in a sector-shaped piece would be the angle formed between two radial faces 16 and 18 respectively. As will be appreciated by those skilled in the art, if a sector-shaped piece is to be utilized, it will need to be machined so the curvilinear surface 20 will become a flat surface 22 suitable for forming a portion of an adhesively bonded joint within wood article 10. The plane line 24 depicts a plane of cut or other machining step through the sector-shape piece at an angle $\alpha$ from radial face 16. While it is not necessary to generate a 90° angle within a triangular-shaped piece to practice the present invention, by so generating a right triangle and utilizing them in forming wood article 10, a rectangular cross-sectional shape can be generated. As will be appreciated by those skilled in the art when utilizing triangular-shaped pieces with angles α other than 90°, then the cross-sectional shape of a parallelogram will result. It is the angle α that will be positioned within the interior of article 10.

Turning now back to FIG. 1, the triangular-shaped pieces 12 are joined together along elongated adhesive joints each indicated at 26. The juxtaposed surfaces to be joined together at adhesive joints 26 are the surface directly opposite the apex angle β of one piece and at least a portion of the surface that is between the interior angle α and the apex angle β within the next adjacent triangular-shaped piece. When right triangles are being utilized, it should be apparent that the right angles of each piece will be positioned internally and the hypotenuse of each piece will then form an exterior surface 27 of wood article 10.

In the wood article 10 of FIG. 1, since the triangular-shaped pieces have a small apex angle, the result will be that a uniformly sized, elongated central aperture 28 will be formed. Aperture 28 in the final wood article 10 can be utilized to contain wires or the like.

Figure 3:
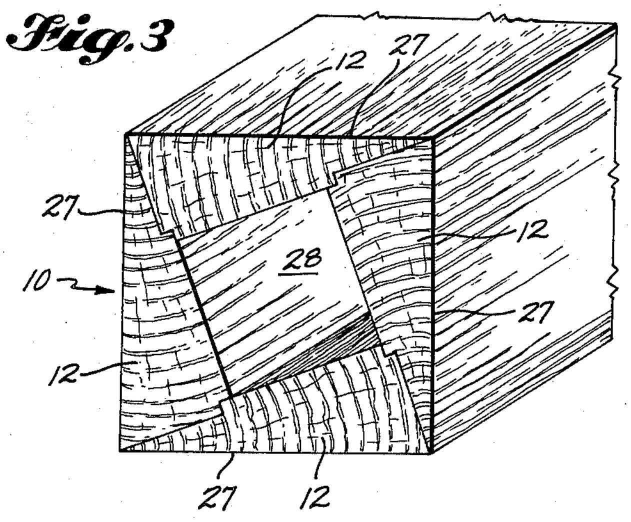
FIG. 3 is a view similar to FIG. 1 showing a modified feature of the present invention.
Figure 4:
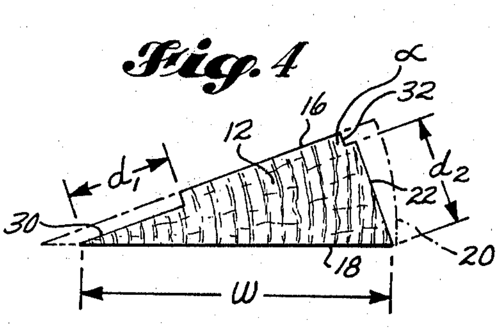
FIG. 4 is a view similar to FIG. 2 and shows an individual sector-shaped piece prepared to result in the modified feature.

Referring now to FIGS. 3 and 4 in particular, a modification will be described to the forming process whereby triangular or sector-shaped pieces have key geometries in order to simplify assembly and increase yields.

Looking first at FIG. 4, a typical triangular-shaped piece 12 comprised of the sector cut from a log having radial faces 16 and 18 and a curvilinear surface 20 is depicted. Depending upon the dimensions of a rough triangular-shaped piece, it will necessarily be machined prior to being assembled into the composite article 10. Of course, the first criteria is to determine the cross-section desired for final composite article 10. In FIG. 4 the exterior width dimension is depicted as w. A machined key 30 and a smaller machined key 32 are sized so as to result first in the dimension w and secondly in a flat, elongated joinder surface with each having a width dimension indicated as $d_1$ and $d_2$. The $d_2$ dimension includes flat surface 22 and is adjacent the smaller machined key 32. By uniformly machining the surfaces in the manner just described, the proper profile for each triangular-shaped piece 12 will be provided and the joinder surfaces are prepared prior to bonding. Since the machining step will provide uniformly flat surfaces, taper within a sector-shaped piece may be utilized in the final wood article 10; that is, by machining the flat surface 22 angularly from the apex 14, a portion of the taper volume can be included under surface 22.

Figure 5:
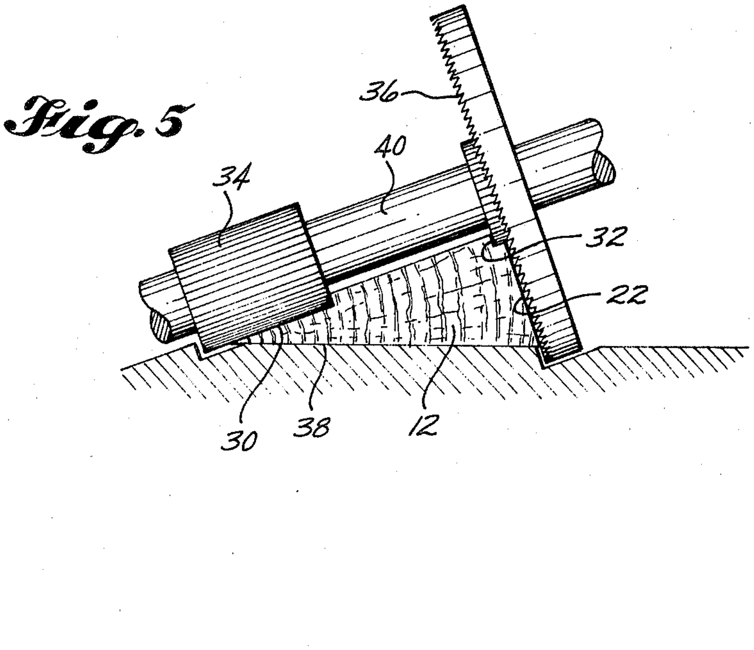
FIG. 5 is an end view of a machining station showing the sector-shaped piece of FIG. 4 being machined.

The profiling step may be carried out as depicted in FIG. 5 with the use of two fixed position cutter heads 34 and 36. The triangular-shaped piece 12 is conveyed in a straight path through the cutting station atop a suitable base 38 and the cutter heads 34, 36, which are mounted on common shaft 40, remove the appropriate wood to generate flat surface 22 and machined keys 30, 32. It will, of course, be appreciated by those skilled in the art that if sector-shaped pieces are utilized, logs within diameter classes will be selected for yielding appropriately sized sector-shaped pieces depending upon the finally desired cross-sectional shape of composite wood article 10. A sizing procedure for generating suitably sized sector-shaped pieces may be understood by referring to the Hasenwinkle U.S. Pat. No. 3,961,654.

Figure 6:
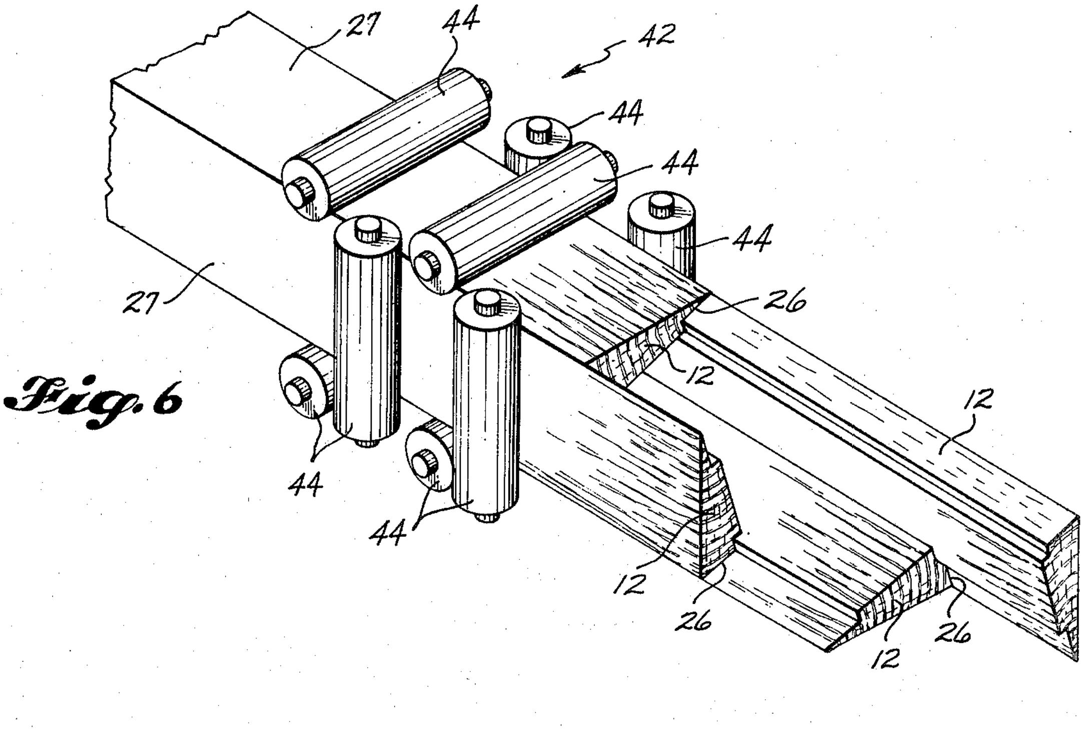
FIG. 6 is an isometric view showing four sector-shaped pieces in position and loosely connected together as they enter the pressing station for curing.

Referring now to FIG. 6, the joining process will be described for adhesively bonding the triangular-shaped pieces together. In joining together the four triangular-shaped pieces 12, the first step is to apply adhesive over those surfaces that will be juxtaposed upon joinder. The adhesive may be applied through any suitable means (not shown), such as through the use of an adhesive spray, roll spreading, or by extrusion. The triangular-shaped pieces 12 are then brought together and the loose adhesive joints 26 are established at the four joinder points about the periphery. When the triangular-shaped pieces 12 have the machined keys, the four pieces will be readily handled as an integral article for advancing into the press-curing station generally indicated at 42. Press-curing station 42 is comprised of any suitable pressing means and is depicted in FIG. 6 as being comprised of a plurality of longitudinally spaced pressure rolls 44 positioned so as to abut all four external faces 27. The series of press rolls 44 will extend longitudinally a distance suitable to allow for the curing of the adhesive joints 26. Any other suitable pressing means may be utilized and many alternative press systems will occur to those skilled in the art. When the triangular-shaped pieces 12 to be joined together are not keyed, they can, for example, be held in their proper spatial orientation as they are conveyed into the press-curing station by way of an elongated mandrel (not shown). In FIG. 6, the ends of each of the triangular-shaped pieces are staggered with respect to one another and suitable adhesively bonded end joints could be formed to result in an infinitely long composite wood article with a traveling cutoff saw (not shown), then cutting the article 10 to its finally desired length.

The article geometry results in a cross-section which increases bending and buckling strength per weight ratios over conventional solid-sawn beams and thereby results in a more efficient utilization of wood. It will also occur to those skilled in the art that combinations of composite wood articles 10 may be generated, thereby resulting in larger composite structures for various end uses.

While detailed descriptions of the composite article and its method of manufacture have been given, it is to be understood that many changes and modifications can be made by those skilled in the art without departing from the broad scope of the invention. All such changes and modifications are intended to be included within the scope of the following claims.

What is claimed is:

1. An elongated wood article comprising:

a plurality of four elongated triangular-shaped pieces joined together into the cross-sectional shape of a parallelogram and with at least two pairs of two opposed pieces being substantially similar in cross-sectional size, said triangular-shaped pieces being joined together along elongated joints, each piece being joined to two adjacent pieces with one surface thereof being joined over its entire surface and the other surface thereof being joined over less than a whole portion of its surface thereby resulting in an elongated hollow section in the article.

2. A composite wood article as in claim 1 in which the triangular-shaped pieces are sectors of logs.

3. A composite wood article as in claim 1 in which the triangular-shaped pieces are right triangles, thereby forming a rectangular wood article.

4. A composite wood article as in claim 1 in which each of the triangular-shaped pieces are substantially similar in size.

* * * * *